(12) United States Patent
Ruspa

(10) Patent No.: US 9,296,322 B2
(45) Date of Patent: Mar. 29, 2016

(54) VEHICLE SEAT

(71) Applicant: Ruspa Officine S.p.A., Robassomero (IT)

(72) Inventor: Renzo Ruspa, Turin (IT)

(73) Assignee: Ruspa Officine S.p.A., Robassomero (IT)

( * ) Notice: Subject to any disclaimer, the term of this patent is extended or adjusted under 35 U.S.C. 154(b) by 54 days.

(21) Appl. No.: 14/249,795

(22) Filed: Apr. 10, 2014

(65) Prior Publication Data

US 2014/0306506 A1    Oct. 16, 2014

(30) Foreign Application Priority Data

Apr. 10, 2013    (IT) .............................. TO2013A0290

(51) Int. Cl.
*A47C 7/02* (2006.01)
*B60N 2/68* (2006.01)
*B60R 22/26* (2006.01)

(52) U.S. Cl.
CPC *B60N 2/686* (2013.01); *B60N 2/68* (2013.01); *B60N 2/682* (2013.01); *B60N 2/688* (2013.01); *B60R 22/26* (2013.01)

(58) Field of Classification Search
CPC ................ B60R 22/3405; B60R 22/26; B60R 2022/029; B60R 2022/263
USPC ................... 297/474, 452.19, 452.2
See application file for complete search history.

(56) References Cited

U.S. PATENT DOCUMENTS

| | | | | |
|---|---|---|---|---|
| 2,720,914 A * | 10/1955 | Doty et al. | ............... | 297/452.19 |
| 3,371,942 A * | 3/1968 | Buck et al. | ..................... | 297/474 |
| 5,655,816 A * | 8/1997 | Magnuson et al. | ......... | 297/452.2 |
| 7,377,590 B2 * | 5/2008 | Mattes et al. | .................. | 297/483 |
| 9,039,094 B2 * | 5/2015 | Yamada et al. | ........... | 297/452.18 |
| 2004/0222686 A1 | 11/2004 | Leighton | | |
| 2008/0191540 A1 * | 8/2008 | Morris | ......................... | 297/474 |
| 2009/0322067 A1 | 12/2009 | Nezaki | | |
| 2012/0193960 A1 * | 8/2012 | Moegling et al. | ............. | 297/313 |

FOREIGN PATENT DOCUMENTS

| | | |
|---|---|---|
| DE | 101 09 868 A1 | 9/2001 |
| DE | 10 2009 020 831 A1 | 12/2009 |
| EP | 1 332 914 A1 | 8/2003 |

* cited by examiner

*Primary Examiner* — Laurie Cranmer
(74) *Attorney, Agent, or Firm* — Blank Rome LLP

(57) ABSTRACT

A vehicle seat comprising a load-bearing structure and a first and a second shaped panel carried by the load-bearing structure and forming the seat base and the backrest of the seat, respectively. The load-bearing structure comprises a first and a second supporting side element which extend along opposite sides of the seat and are interconnected to each other by a transversal element which extends at the junction zone of the seat base with the backrest. A third panel is provided, facing the second and defining a pocket seat for accommodating the webbing of a seat belt, with the second panel and with the supporting side elements.

8 Claims, 4 Drawing Sheets

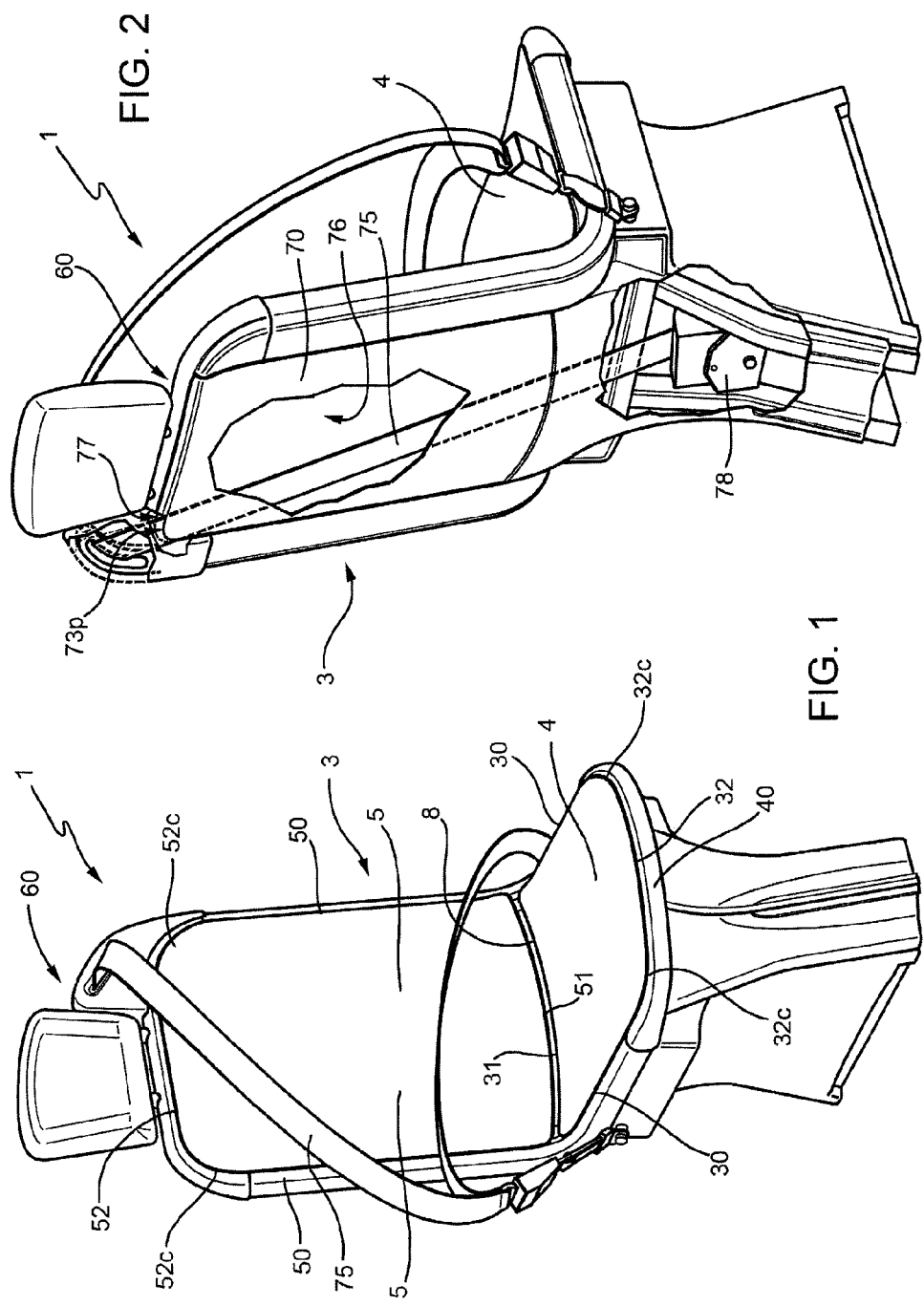

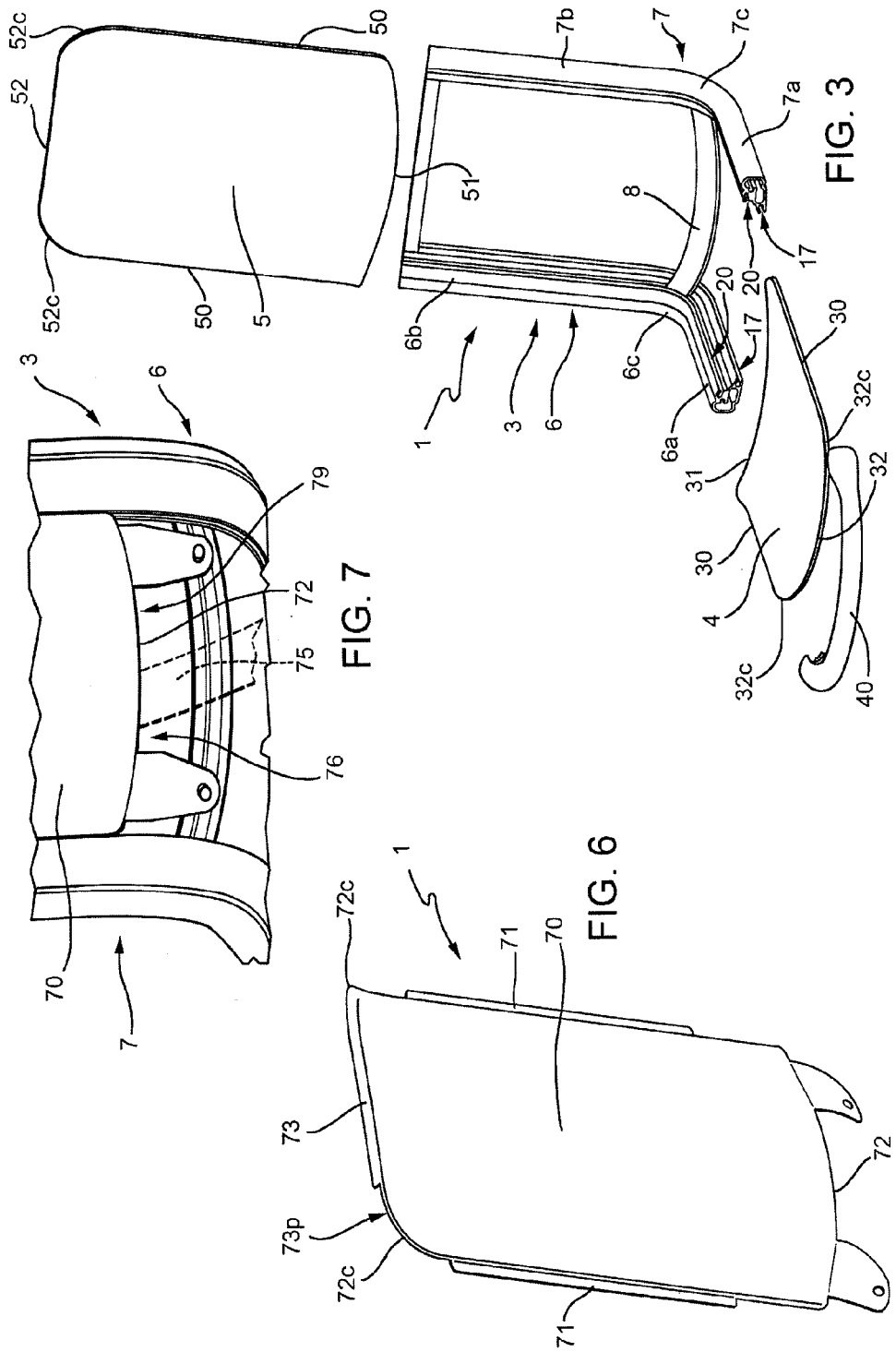

VEHICLE SEAT

BACKGROUND OF THE INVENTION

1. Field of the Invention

The present invention relates to a vehicle seat.

In particular, the object of the present invention is to make a vehicle seat that comprises a limited number of parts which can be produced quickly and cheaply, even by unskilled workers, has a sturdy structure, and is provided with a backrest capable of accommodating part of the webbing of the seat belt thus allowing the protection thereof.

2. Description of the Related Art

European Patent EP-B-1 332 914, filed by the same Applicant, describes a vehicle seat comprising a load-bearing structure and a first and a second shaped panel carried by the load-bearing structure and forming the seat base and the backrest of the seat, respectively. The load-bearing structure comprises a first and a second supporting side element (generally made of metal material, for example aluminium), which extend along opposite sides of the seat and are interconnected to each other by a transversal element which extends at the junction zone of the seat base with the backrest. Each supporting side element comprises a first rectilinear segment and a second rectilinear segment having typically a greater length with respect to the first segment and interconnected with the first segment by an integral, folded joint zone.

According to European Patent EP-B-1 332 914, each first rectilinear segment has a respective first groove extending substantially for the entire length thereof and each second rectilinear segment has a respective second groove extending substantially for the entire length thereof;

the first grooves are arranged facing each other and are adapted to accommodate respective opposite side edges of the first panel forming the seat base, while the second grooves are arranged facing each other and are adapted to accommodate respective opposite side edges of the second panel forming the backrest.

Thus a simple, sturdy seat is made, that is fast to assemble and disassemble. In particular, the seat according to Patent EP-B-1 332 914 allows the seat base and/or the backrest to be quickly replaced should these components have been damaged following acts of vandalism.

SUMMARY OF THE INVENTION

It is the object of the present invention to improve the seat according to Patent EP-B-1 332 914 in order to make a version in which the backrest may form a rear compartment to allow the protection thereby of the webbing of a seat belt associated with the seat.

The preceding object is achieved by the present invention as it relates to a vehicle seat comprising a load-bearing structure and a first and a second shaped panel carried by the load-bearing structure and forming the seat base and the backrest of the seat, respectively, the load-bearing structure comprises a first and a second supporting side element which extend along opposite sides of the seat and are interconnected to each other by a transversal element which extends at the junction zone of the seat base with the backrest;

each supporting side element comprises a first rectilinear segment and a second rectilinear interconnected with said first segment by a folded joint zone, each first rectilinear segment is provided with an elongated groove which communicates with the outside and is adapted to accommodate a respective side edge of a first, approximately rectangular panel forming a seat base of the seat;

each second rectilinear segment is provided with a first elongated groove which communicates with the outside and is adapted to accommodate a respective side edge of a second, approximately rectangular panel forming a backrest of the seat, characterized in that said at least second rectilinear segment is provided with a second elongated groove parallel to the first groove and spaced apart with respect to it on the first segment; said seat comprising a third shaped panel with a plan similar to the second shaped panel and limited on rectilinear side edges by a lower edge and by an upper edge;

each rectilinear side edge of the third panel is accommodated in a respective second groove so that the third panel is arranged facing the second panel and defines a cavity configured to accommodate a segment of the webbing of a seat belt assembly of the seat with the second panel and with the side elements.

BRIEF DESCRIPTION OF THE DRAWINGS

The invention will now be illustrated with particular reference to the accompanying drawings, which depict a preferred, non-limiting embodiment in which:

FIG. 1 shows a front perspective view, of a vehicle seat made according to the dictates of the present invention;

FIG. 2 shows a rear perspective view, of a vehicle seat made according to the dictates of the present invention;

FIG. 3 shows a front exploded view, of a vehicle seat made according to the dictates of the present invention;

FIG. 6 shows a first detail of the seat according to the present invention; and

FIG. 7 shows a second detail of the seat of the present invention.

DETAILED DESCRIPTION OF THE INVENTION

Figure 4:
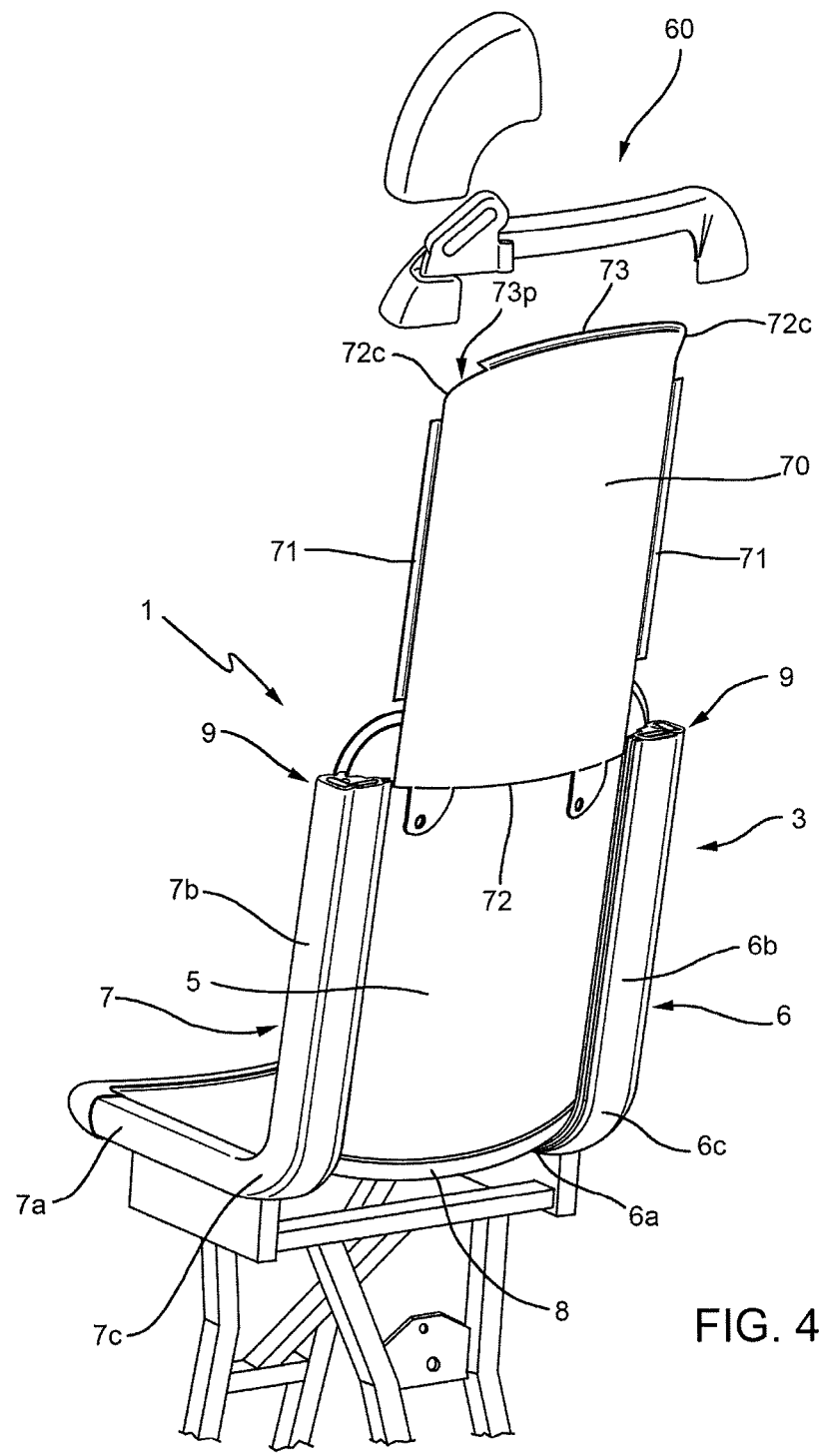
FIG. 4 shows a rear exploded view, of a vehicle seat made according to the dictates of the present invention.

Reference numeral 1 in FIGS. 1, 2, 3 and 4 identifies a vehicle seat, as a whole, made according to the dictates of the present invention.

The vehicle seat 1 comprises a load-bearing structure 3 and a pair of shaped panels 4, 5 carried by the load-bearing structure 3 and forming the seat base and the backrest of seat 1, respectively.

The load-bearing structure 3 comprises a first and a second supporting side element 6, 7 (FIGS. 3, 5 and 7) which extend along opposite sides of seat 1 and are interconnected to each other by a transversal element 8 (FIGS. 3 and 1) which extends at the junction zone of the seat base with the backrest.

More specifically, each supporting side element 6, 7 comprises a first rectilinear segment 6a, 7a and a second rectilinear segment 6b, 7b (FIG. 3) having typically a greater length with respect to the first segment 6a, 7a (in certain applications, the lengths may be the same) and interconnected with the latter by a C-shaped integral joint zone 6c, 7c.

Figure 5:
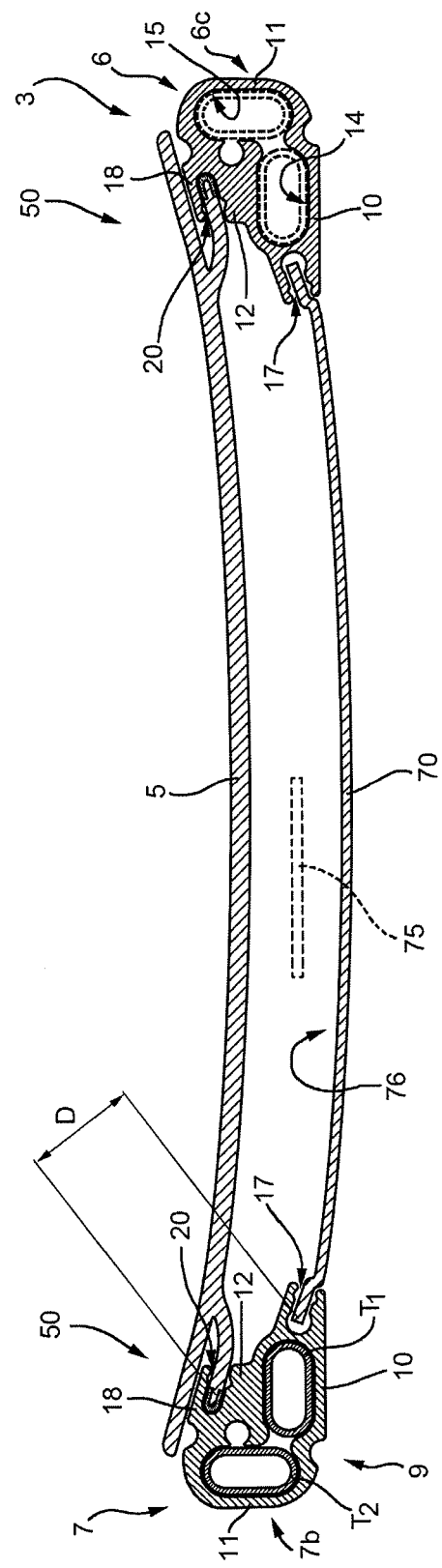
FIG. 5 shows a section of the backrest of the vehicle seat made according to the dictates of the present invention.

Each supporting side element 6, 7 is preferably made of a tubular-type metal profile 9 (for example, made of aluminium by extrusion, refer to FIG. 5).

In particular (FIG. 5), the metal profile 9 has an approximately right-triangle-shaped section with curved edges delimited by a first, approximately flat wall 10 (corresponding to a first straight side), by a second, approximately flat wall 11 (corresponding to a second straight side), perpendicular to the first wall and integral therewith and by a third wall 12 corresponding to the greater side or hypotenuse in the triangular section.

The walls 10, 11 and 12 internally delimit two cavities 14, 15 which communicate with each other and each have a triangular section with curved smaller sides.

According to a preferred embodiment of the invention, cavity 14 may accommodate a first steel tube T1 with a section corresponding to the one of cavity 14 (and that is a triangular section with curved smaller sides) in order to give the supporting element 6, 7 greater rigidity and solidity (obviously the insertion of a steel tube involves increasing the weight of seat 1). The steel tube T1 may also be arranged at certain portions of the supporting element 6, 7, for example at the middle of the longest side in the anchoring area of the armrest (not shown) or of the areas where greater rigidity is required.

In order to allow further stiffening of the supporting element 6, 7, cavity 15 may accommodate a second steel tube T2 with a section corresponding to the one of cavity 15 (and that is a triangular section with curved smaller sides).

The steel tube T2 may also be arranged at certain portions of the supporting element 6, 7, for example at the middle of the longest side in the anchoring area of the armrest (not shown) or of the areas where greater rigidity is required.

The end edges of the first and second wall 10 and 11 define a first groove 17 which opens towards the outside of profile 9 and extends towards an edge of the triangular section.

The third wall 12 has an integral appendix 18 which delimits a second groove 20 and opens towards the outside of profile 9 and which is spaced apart along the third wall 12 by a pitch D with respect to the first groove 17.

The transversal element 8 (FIG. 3) is preferably made by means of a metal profile (for example, made of aluminium) comprising a square-section tubular central portion and two pairs of walls (not shown) which extend integrally on opposite faces of the central portion 22 thus forming respective grooves (not shown). Thus there are two grooves which extend along opposite sides of the transversal element 8.

Opposite end portions of the square-section tubular central portion 22 are adapted to accommodate, in a coupling position, respective appendices (not shown) which extend from the joint zone 6c, 7c. The appendices are stably fastened to the transversal element 8 using screws (not shown). In such a coupling position, the appendices are arranged between the walls thus engaging end segments of the grooves.

In its simplest embodiment (shown in FIGS. 2 and 3), the shaped panel 4 has an approximately rectangular shape in plan and constant thickness and is limited on (FIG. 1) two rectilinear side edges 30, by a substantially rectilinear rear edge 31 and by a rectilinear front edge 32 jointed with the side edges 30 by two curved edges 32c.

For the assembly of the seat, the rear edge 31 of panel 4 is accommodated in the groove of element 8, the side edges 30 (or an appendix thereof) are accommodated in the second groove 20 of the segments 6a, 6b so that the supporting side elements 6, 7 support panel 4 on opposite sides (the first groove 17 is not used) and the front edge 32 is arranged abutting against a C-shaped connection element 40 (FIG. 1) which forms part of the load-bearing structure 3 and extends between end portions of the first rectilinear segments 6a, 7a. More specifically, the C-shaped connection element 40 comprises a substantially rectilinear central portion jointed integrally at the ends thereof with C-shaped curved portions from which rectilinear appendices extend (not shown), parallel to each other and having a smaller transversal section with respect to the section of the curved portions. The rectilinear appendices are adapted to be inserted into respective openings formed by end portions of the first tubular rectilinear segments 6a, 7a. To this end, each appendix has a section which is complementary to the transversal section of the tubular supporting element 6, 7. The front edge 32 is arranged abutting against the rectilinear portion and the curved portions 32c are arranged abutting against the C-shaped curved portions.

In its simplest embodiment shown in FIG. 1, the shaped panel 5 has an approximately rectangular shape in plan and constant thickness and is limited on (FIG. 1) two rectilinear side edges 50, by a substantially rectilinear lower edge 51 and by a rectilinear upper edge 52 jointed with the side edges 50 by two curved edges 52c.

For the assembly of the backrest, the lower edge 51 of panel 4 is accommodated in the groove of element 8, the side edges 50 (or an appendix close to such edges, as shown in FIG. 5) are accommodated in the second groove 20 of the segments 6b, 7b so that the supporting side elements 6, 7 support panel 5 and the upper edge 52 is arranged abutting against a C-shaped connection element 60 (FIGS. 1 and 2) which forms part of the load-bearing structure 3 and extends between end portions of the second rectilinear segments 6b, 7b. More specifically, the C-shaped connection element 60 comprises a substantially rectilinear central portion jointed integrally at the ends thereof with C-shaped curved portions from which rectilinear appendices extend (not shown), parallel to each other and having a smaller transversal section with respect to the section of the curved portions. The rectilinear appendices (not shown) are adapted to be inserted into respective openings formed by end portions of the second tubular rectilinear segments 6b, 7b. To this end, each appendix (not shown) has a section which is complementary to the transversal section of the tubular supporting element 6, 7. The central portion is arranged abutting against the upper edge 52 and the curved portions are arranged abutting against the edges 52c.

According to the present invention, there is provided a third shaped panel 70 with a plan similar to the shaped panel 5 (FIG. 6). In the embodiment shown, the third shaped panel 70 has an approximately rectangular shape in plan and constant thickness and is limited on (FIG. 1) two rectilinear side edges 71, by a substantially rectilinear lower edge 72 and by an upper rectilinear edge 73 jointed with the side edges 71 by two curved edges 72c.

According to the present invention, each rectilinear edge 71 (in the shape of a lip) of the third panel 70 is accommodated in the first groove 17 (FIG. 5) of a respective segment 6b, 7b of the supporting side element 5, 6 so that the third panel 70 is arranged facing the second panel 5 and defines a pocket cavity 76 with constant thickness (refer also to FIGS. 2 and 6) with the second panel and with the side elements 5, 6. Cavity 76 is adapted to accommodate a segment of webbing 75 of the seat belt assembly 78 (shown in FIG. 2) assembled on seat 1.

Conveniently, the third panel 70 is shaped with respect to the second panel 5 so that the upper edge 73 (or a portion thereof 73p, FIGS. 6 and 2) is spaced apart with respect to the rear face of panel 5 facing panel 70 to make a groove 77 (FIG. 2) which allows webbing 75 out from cavity 76 and the sliding thereof.

The third panel 70 is shaped with respect to the second panel 5 (FIG. 7) so that also the lower edge 72 (or a portion thereof, FIG. 7) is spaced apart with respect to the rear face of panel 5 facing panel 70 to make a groove 79 which allows webbing 75 out from cavity 76 towards the take-up device 78 (shown in FIG. 1) of the seat belt assembly.

The advantages of the present invention are clear from the above disclosure because the seat described above, comprising an extremely limited number of pieces and having a sturdy structure, allows webbing 75 of the seat belt assembly to be installed inside cavity 76. Thereby, webbing 75 is protected and the operation of the seat belt assembly is saved over time. In particular, the webbing is prevented from being damaged by the conduct of the passengers carried by the vehicle on which the seats are installed (should the passengers in the vehicle rest their feet against the backrest of the seat).

The seat made according to the present invention is advantageously applied on a variety of vehicles, such as vehicles providing "road" transportation, for example city buses, coaches, etc., but also vehicles providing "rail" transportation, for example trams, underground lines, etc.

For all specific applications, seat 1 is stably connected to the vehicle, in particular to a resting surface made on the vehicle, by means of suitable interconnecting elements (not shown) of known type. The seat belt assembly 78 (shown in FIG. 1) is generally fastened to such interconnecting elements.

Such interconnecting elements are generally connected with the lower portion of the first rectilinear segments 6a, 7a.

Lastly, it is clear that modifications and variants may be made to the vehicle seat described and illustrated herein without departing from the scope of protection of the present invention.

What is claimed is:

1. A vehicle seat comprising a load-bearing structure and a first and a second shaped panel carried by the load-bearing structure and forming a seat base and a backrest of the seat, respectively, the load-bearing structure comprises a first and a second supporting side element which extend along opposite sides of the seat and are interconnected to each other by a transversal element which extend at a junction zone of the seat base with the backrest;
   each supporting side element comprises a first rectilinear segment and a second rectilinear segment interconnected with said first segment through a folded joint zone,
   each first rectilinear segment is provided with an elongated groove which is adapted to accommodate a respective side edge of a first, approximately rectangular panel forming the seat base of the seat; each second rectilinear segment is provided with a first elongated groove which is adapted to accommodate a respective side edge of a second, approximately rectangular panel forming the backrest of the seat;
   wherein said second rectilinear segment is provided with a second elongated groove parallel to the first elongated groove and spaced apart with respect to it on the first rectilinear segment; said seat comprising a third shaped panel with a plan similar to the second shaped panel and limited on rectilinear side edges by a lower edge and by an upper edge;
   each rectilinear side edge of the third panel is accommodated in the respective second elongated groove so that the third panel is arranged facing the second panel and defines a cavity configured to accommodate a segment of a webbing of a seat belt assembly of the seat with the second panel and with the side elements.

2. A seat according to claim 1, wherein said third panel is shaped with respect to the second panel so that said upper edge or a portion thereof is spaced apart with respect to a rear face of the second panel facing the third panel to make a groove which allows a webbing out from the cavity.

3. A seat according to claim 1, wherein said third panel is shaped with respect to the second panel so that said lower edge or a portion thereof is spaced apart with respect to a rear face of the second panel facing the third panel to make a groove which allows the webbing out from the cavity towards a winding device carried by the seat.

4. A seat according to claim 1, wherein each supporting side element is made of an internally hollow tubular profile adapted to accommodate stiffening elements.

5. A seat according to claim 1, wherein each supporting side element consists of a profile which has an approximately right-triangle-shaped section with curved edges delimited by a first approximately flat wall corresponding to a first straight side, by a second, approximately flat wall corresponding to a second straight side, perpendicular to the first wall and integral therewith and by a third wall corresponding to the greater side or hypotenuse in the triangular section.

6. A seat according to claim 5, wherein said first, second and third wall internally define two cavities which communicate with each other, the cavities each having a triangular section with curved smaller sides.

7. A seat according to claim 1, wherein said load-bearing structure comprises a first C-shaped connection element comprising a substantially rectilinear central portion and two curved end portions integral with the central portion, wherein each of the two curved end portions is coupled to a respective end portion of the first rectilinear segment.

8. A seat according to claim 1, wherein said load-bearing structure comprises a second C-shaped connection element comprising a substantially rectilinear central portion and two curved end portions integral with the central portion, wherein each of the two curved end portions is coupled to a respective end portion of the second rectilinear segment.

* * * * *